United States Patent [19]

Liu

[11] 3,771,977

[45] Nov. 13, 1973

[54] BEARING SURFACE
[75] Inventor: Chong Tan Liu, Tonawanda, N.Y.
[73] Assignee: Hooker Chemical Corporation, Niagara Falls, N.Y.
[22] Filed: Dec. 27, 1971
[21] Appl. No.: 212,791

[52] U.S. Cl.............................................. 29/195 P
[51] Int. Cl............................................. B32b 15/08
[58] Field of Search................................... 29/195 P

[56] References Cited
UNITED STATES PATENTS

| 3,661,538 | 5/1972 | Brown et al. | 29/195 |
| 3,479,160 | 11/1969 | Klinger et al. | 29/195 |
| 3,488,166 | 1/1970 | Kovac et al. | 29/195 |
| 3,595,761 | 7/1971 | Saubestre et al. | 29/195 X |
| 3,629,922 | 12/1971 | Miller et al. | 29/195 |
| 3,650,708 | 3/1972 | Gallagher | 29/195 |
| 3,681,209 | 8/1972 | Campbell et al. | 29/195 X |

Primary Examiner—L. Dewayne Rutledge
Assistant Examiner—E. L. Weise
Attorney—Peter F. Casella et al.

[57] ABSTRACT

A bearing material which comprises a base, which base has a phenolic or other thermoset plastic surface, and a bearing surface, adherently deposited on said phenolic surface, of from 0.02 to 0.62 mils of at least one metal selected from nickel, copper and chromium. The metal bearing surface may be a single layer of an electrolessly applied metal, such as an electroless nickel layer, or multiple layers of electrolessly and electrolytically applied metal, having a total thickness of 0.02 to 0.62 mils.

10 Claims, No Drawings

BEARING SURFACE

This invention relates to an improved bearing surface and more particularly it relates to an improved bearing material, adapted for fabrication from non-metallic components, which is particularly useful under high load conditions.

The replacement of metal components with various plastic materials has become increasingly prevalent in many manufactured items. Such replacement frequently has the advantage of obtaining structural strength which is at least as great as that of metal but with an appreciable reduction in weight, as well as in material cost. Additionally, the cost of fabricating the component parts of plastics is often less than the fabrication cost for metals and it is frequently possible to produce shapes and configurations which cannot be made when metals are used.

In some areas, however, it has not always been found to be feasible, or even possible to substitute plastic components for metal. One such area has been in bearing surfaces, particularly those in which the bearing surface is subjected to operating conditions of high load and/or torque. In these situations, the more common plastic materials have frequently not had a sufficiently hard or resistant surface to stand up under the operating conditions. Additionally, where plastic materials have been developed whose hardness characteristics would be suitable for such uses, the cost of such materials has frequently been sufficiently high to make their use economically unfeasible.

It is, therefore, an object of the present invention to provide an improved bearing material which is particularly adapted for use under conditions of high load and/or torque.

A further object of the present invention is to provide an improved bearing material which may utilize relatively inexpensive plastic materials in its structure.

These and other objects will become apparent to those skilled in the art from the description of the invention which follows. Pursuant to the above objects, the present invention includes a bearing material which comprises a base, which base has a surface of a thermoset plastic, and a bearing surface, adherently deposited on said thermoset plastic surface, of from 0.02 to 0.62 mils of at least one metal selected from nickel, copper and chromium. These bearing materials have been found to provide excellent wear resistance, even when used under operating conditions of high load and/or torque, and have frequently been found to out-perform metallic bearing materials.

More specifically, the bearing materials of the present invention comprise a base which has, as a preferred thermoset plastic surface, a phenolic surface. Adherently deposited on this phenolic surface is a bearing surface which is a layer of at least one metal selected from nickel, copper and chromium, having a thickness of from 0.02 to 0.62 mil and preferably from about 0.05 to 0.3 mils. In the most preferred embodiment of the present invention, the thickness of this bearing surface is about 0.1 mil.

The base of the bearing material of the present invention may be of various materials, provided it has a thermoset plastic surface, such as a phenolic surface, on which the bearing surface is adherently deposited. Accordingly, the base may be formed completely of the thermoset plastic material, thus providing the thermoset plastic surface on which the bearing surface is deposited. Alternatively, the base may be a composite structure, such as one having a metallic backing plate to which is bonded a thermoset plastic material so as to provide the requisite thermoset plastic surface. The particular structure of the base will depend upon the desired configuration of the bearing surface and the environment in which it is to be used. In many instance, however, it has been found to be preferred if the base structure is formed substantially completely of the thermoset plastic material, as such configuration permits the attainment of the maximum advantages from the use of a plastic substance rather than a metallic one, as has been indicated hereinabove.

Typical thermoset plastics which may be used include alkyd resins; epoxy resins; furan resins, such as furfuryl alcohol or furfuralketone; polyurethanes; melamine resins, such as melamine-formaldehyde or melamine-urea-formaldehyde; phenolic resins;polyester resins, such as unsaturated polyesters of dibasic acids and dihydroxy compounds; resorcinol resins, such as resorcinol-formaldehyde, resorcinol-furfural, resorcinol-phenol-formaldehyde, resorcinol-polyamide or resorcinol-urea; polymers of diallyl phthalates or phthalates; and the like. Of these, the preferred thermoset plastic materials for use in the present invention have been found to be the phenolic resins and, hereinafter, specific reference will be made to these materials.

The phenolic material which provides the preferred thermoset plastic surface on which the bearing surface is deposited may be formed from the various phenolic resins as are known to those in the art. Exemplary of the phenolic resins which may be used are phenol-formaldehyde, phenolic-elastomer, phenolic epoxy, phenolic-polyamide, phenolic-vinyl acetals and the like. Moreover, the phenolic or other thermoset plastic used may be either filled or unfilled, the specific composition in each instance being selected so as to provide the optimum properties to meet the requirements of the particular utilization.

The bearing surface which is adherently deposited on the phenolic surface is a coating of at least one metal selected from nickel, copper, and chromium, which coating has a thickness of from 0.02 to 0.62 mils. In the most preferred embodiment, this metal bearing surface is a layer of an electrolessly applied metal, such as an electroless nickel or electroless copper layer, having a thickness within the indicated range. Although multiple layers of different electrolessly applied metals may be utilized, such as a layer of electroless copper followed by a layer of electroless nickel, in the most preferred embodiment, the metal bearing surface is a single layer of electroless nickel, having a thickness of about 0.1 mil. Alternatively, however, the metal bearing surface may be formed of muliple layers of electrolessly and electrolytically applied metal, the total thickness of which layers is within the range of 0.02 to 0.62 mils. Where such multiple layers are utilized, they may typically include a first layer of an electroless metal, such as electroless nickel, followed by successive layers of electrolytically applied metal, such as semi-bright and/or bright nickel, followed by a top or flash layer of electrolytically applied chromium. Typical of such a multi-layer bearing surface is one having an electroless nickel coating of 0.2 mils, an electrolytically applied coating of semi-bright nickel having a thickness of 0.2 mils, an electrolytic bright nickel coating of 0.2 mil thickness and a flash electrolytic coating of chromium having a thickness of 0.02 mils. It is to be appreciated, of course, that in addition to the above, various other combinations of electroless and electrolytic metal deposits may also be used to form the bearing surface of the present invention, as are known to those in the art.

The electroless nickel and copper plating baths utilized in forming the bearing surface of the present invention are conventional electroless plating baths of this type, as are known to those in the art. Typically these baths will contain a reducible nickel or copper salt, a reducing agent, as well as buffering agents, complexing agents and the like. Suitable metal salts which may be used in such baths are nickel chloride, copper nitrate, copper sulfate, and the like, while suitable reducing agents include the alkali metal and alkaline earth metal hypophosphites, formaldehyde, hydroquinone, hydrazine, and the like. By way of further illustration of the specific electroless nickel and copper plating baths which are suitable and the manner in which such baths are used, reference is made to the Metal Finishing Guide Book Directory of 1966, published by Metals and Plastics Publications Inc., Westwood, N.J.

Similarly, where electrolytic deposits are also utilized in forming the bearing surfaces, these may be deposited from conventional nickel, copper, and/or chromium electroplating baths, as are known to those in the art. Such baths typically contain the metal which is to be plated dissolved in an aqueous plating solution, although non-aqueous media may also be employed. Here again, examples of specific electroplating baths which are suitable and the manner in which they are operated are set forth in the aforementioned Metal Finishing Guide Book Directory for 1966.

In forming the bearing surface on the phenolic material, the phenolic is subjected to a preplating process whereby the phenolic surface is made sufficiently active as to permit the adherent deposition of the metallic bearing surface. Various preplating processes, as are known in the art for the treatment of phenolic surfaces, may be used. Typically, these preplating processes include a pretreatment of the substrate surface, which pretreatment may involve etching the phenolic surface and/or treating it with a solvent, secondly sensitizing the etched surface with one or more sensitizing solutions and, finally, activating the phenolic surface by treatment with a metal salt solution.

Exemplary of a specific preplating process which may be used is one which comprises first etching the phenolic surface with a solution of chromic acid and sulfuric acid, either with or without the addition of phosphoric acid, secondly sensitizing the etched surface with a stannous chloride solution and, thirdly, activating the thus-sensitized surface by treatment with a solution of a palladium salt, such as palladium chloride.

Other typical preplating processes which may be used are exemplified by the following:

1. Activation of the etched phenolic surface with a solution of $Li_2PdCl_4$ and methanol, followed by treatment of the activated surface with an aqueous solution of $NaH_2PO_2$;

2. Activation of the etched phenolic surface with a solution of white phosphorus and sodium in ethanol;

3. Treatment of the etched phenolic surface with elemental white phosphorus, preferably in an organic solvent solution, followed by treatment with a solution of a metal salt or metal salt complex;

4. Treatment of the etched phenolic surface with a low oxidation state phosphorus compound, such as phosphorus sesquesulfide, preferably in an organic solution solution, and thereafter treating with a solution of a metal salt or metal salt complex;

5. Etching of the phenolic surface with a solution of $Na_2S$, followed by activation with a solution of palladium chloride in HCl.

These and other suitable preplating processes are described in U.S. Pat. Nos. 2,690,401; 2,690,402; 2,690,403; 3,235,473; 3,488,166; 3,492,151; 3,523,874; 3,523,875; 3,556,956; and 3,607,351. It is to be appreciated that the specific pretreatment process used is not of particular importance, so long as it is compatible with and results in an adherent deposit of the metal bearing surface on the phenolic surface. Thus, it is important that whatever pretreatment process is used, whether one of those set forth hereinabove or some other process, that this process makes it possible to obtain an adherent deposit of the bearing surface on the phenolic.

Following the application of a suitable preplate, as has been described hereinabove, the phenolic surface is then subjected to the electroless metal plating bath to form, either as such or in conjunction with the subsequent electrolytically applied metal layers, the metallic bearing surface having a thickness within the indicated range of 0.02 to 0.62 mils. As has been noted heretofore, the metal bearing surface is applied from conventional electroless metal plating baths of nickel or copper, using conventional application techniques. The preplated phenolic surfaces on which the metal bearing surface is adherently deposited, will be retained in contact with the electroless plating baths for a period and at a temperature which is sufficient to effect the deposition of the metallic bearing layer having the desired thickness.

The bearing materials which are produced in accordance with the method of the present invention may be utilized in a variety of applications which require wear resistant surfaces under operating conditions of high load and/or high torque conditions. Typical of specific areas in which these bearing materials may be utilized are in thrust bearings and/or thrust washers for automotive uses, such as in automatic transmissions and the like. For such uses, conventional phenolic materials have often been found to fail within only a very few minutes of use, whereas the bearing materials of the present invention have, in many instances, been found to out-wear thrust bearings and washers made of metallic components.

The reason for the unexpected improvement and increase in wear resistance of the bearing materials of the present invention is not fully understood. It is known that numerous factors are involved in the phenomena of wear, including adhesive wear, abrasive wear, oxidation of the surfaces, thermal characteristics of the surfaces, and the like. It is possible that the present metal bearing surfaces of the particular thicknesses which have been found to be operable provide an optimum combination, in terms of the metal hardness, thickness and thermal conductivity, to provide optimum minimization of the adhesive and abrasive wear, while effecting a maximized protection of the phenolic surfaces from oxidation and providing maximum heat dissipation from the surfaces. This is not known for certain, however, but for whatever reason, the metal bearing surfaces of the thicknesses which have been specified herein do give surprising and unexpected wear resistant properties to the phenolic surfaces on which they are adherently deposited.

In order that those skilled in the art may better understand the present invention and the manner in which it may be practiced, the following specific examples are given. In these examples, unless otherwise indicated, parts and percents are by weight and temperatures are in degrees centigrade. It is to be appreciated, however, that these examples are merely exemplary of certain preferred embodiments of the present invention and are not to be taken as a limitation of this invention.

In these examples, phenolic resins were used to mold transmission thrust washers and the resulting thrust washers were subjected to the following treating steps:

1. Acid etch for about 8 minutes in an aqueous solution containing 351 grams per liter chromic acid and 210 ccs per liter concentrated sulfuric acid, at 80° C.
2. Rinse with running water until surface is free of chromic acid.
3. Immerse for 10 seconds in aqueous detergent rinse solution containing 1 cc detergent per 100 milliliters at 65° C.
4. Rinse in running tap water.
5. Rinse by immersion in distilled water.
6. Immerse for two minutes in aqueous sensitizing solution containing 86 grams per liter $SnCl_2 \cdot 2H_2O$, and 89 milliliters per liter of concentrated HCl, at room temperature.
7. Rinse by immersion in tap water.
8. Rinse by immersion in distilled water.
9. Immerse for two minutes in aqueous activating solution containing 1 gram per liter $PdCl_2 \cdot H_2O$ and 1 milliliter per liter concentrated hydrochloric acid at room temperature.
10. Rinse by immersion in tap water.
11. Rinse by immersion in distilled water.
12. Immerse in commercial electroless nickel or copper bath.
13. Rinse by immersion in tap water. Thereafter, the parts were either dried and then tested for wear resistance or they were electroplated with one or more layers of metal, using commercial electroplating baths, and were then tested for wear resistance.

The commercial electroless nickel plating bath utilized in the above procedure had the following composition:

| | |
|---|---|
| Nickel chloride | 30 grams |
| Sodium hypophosphite | 10 grams |
| Sodium citrate | 10 grams |
| Lead acetate | 1 part per million |
| Water | 1000 grams |

The pH of this bath was within the range of 4–6, the temperature was about 88° C, and the plating rate was approximately 0.2 mil per hour. The immersion time of the parts being treated in this bath was varied, depending upon the thickness of the electroless nickel layer which was desired.

Where an electroless copper plate is applied, a commercial electroless copper plating bath is used which is sold by the Enthone Company under the designation "Enplate Cu 402" electroless copper bath. The pH of this bath was about 11.5, the temperature was about 20°–25°C and the plating rate was approximately 0.2 mil per hour. As with the electroless nickel bath, the immersion time varied, depending on the thickness of plate desired.

Additionally, where one or more electroplated layers were formed on the part, a commercial semi-bright nickel electroplating bath of the sulfate-chloride type with brighteners, and/or a commercial bright nickel electroplating bath of the sulfate-chloride type with added brighteners and leveling agents, and/or a commercial chromium electroplating baths of the chromic acid-sulfate type, were used.

Following the application of the electroless metal or electroless-electrolytic metal barren surfaces, the plated thrust washers were tested by immersing them in automatic transmission fluid, at a temperature of about 145° C, and rotating the washer for 20 minutes at 2500 revolutions per minute while it was forced against a stationary pressure plate with an applied pressure of 2,000 pounds, which applied pressure produced a pressure on the thrust washer surfaces of about 680 pounds per square inch. Following this test, which simulates the load applied to a thrust washer in a transmission when the automobile is driven against an unmovable wall at full throttle for 20 minutes, the parts tested were examined to determine whether any appreciable burning of the bearing surface had taken place, those in which there were substantially no burning of the bearing surface being indicated as having pass the test. Using this procedure, the following results were obtained:

| Example | Phenolic | Metal Plate | Test Results |
|---|---|---|---|
| 1 | 2 stage heat resistant identified as Durez 22042 | None | Fail |
| 2 | Same | 0.02 mil electroless Ni | Pass |
| 3 | Same | 0.1 mil electroless Ni | " |
| 4 | Same | 0.1 Mil electroless Cu | " |
| 5 | Same | 0.2 mil electroless Ni | " |
| 6 | Same | 0.2 mil electroless Ni 0.1 mil semi bright Ni 0.02 mil chromium | Pass |
| 7 | 2 stage mineral filled heat resistant identified as Durez 11864 | 0.2 mil electroless Ni 0.2 mil semi-bright Ni 0.2 mil bright Ni 0.02 mil chromium | Pass |
| 8 | Same | 0.1 mil electrodes Ni 0.2 mil semi bright Ni 0.7 mil bright Ni 0.02 mil chromium | Fail |

The procedure of the preceding Examples is repeated with the exception that other thermal setting resins, including alkyd resins, epoxy resins, furan resins, melamine resins, polyester resins, resorcinol resins, phthalate resins, and the like, were substituted for the phenolic resins and comparable results are obtained.

While there have been described various embodiments of the invention, the compositions and methods described are not intended to be understood as limiting the scope of the invention as changes therewithin are possible and it is intended that each element recited in any of the following claims is to be understood as referring to all equivalvent elements for accomplishing substantially the same results in substantially the same or equivalent manner, it being intended to cover the invention broadly in whatever form its principle may be utilized.

What is claimed is:

1. A bearing material which comprises a base, which base has a thermoset plastic surface and a bearing surface, adherently deposited on said thermoset plastic surface, of from 0.02 to 0.62 mils, of at least one metal selected from nickel, copper, and chromium.

2. The bearing material as claimed in claim 1 in which the thermoset plastic surface on said base is a phenolic surface.

3. The bearing material as claimed in claim 2 in which the base is formed substantially entirely of a phenolic material.

4. The bearing material as claimed in claim 3 wherein the metallic bearing surface is an electrolessly deposited metal selected from the indicated group.

5. The bearing material as claimed in claim 3 wherein the metal bearing surface is formed by the electroless deposition of a metal from the indicated group followed by electrolytic deposition of one or more of the indicated metals.

6. The bearing material as claimed in claim 5 wherein the bearing surface is formed by the electroless deposition of a nickel layer, followed by the electrolytic deposition of at least one nickel layer, and thereafter followed by the electrolytic deposition of a chromium layer.

7. The bearing material as claimed in claim 4 wherein the bearing surface is an electrolessly deposited layer of copper.

8. The bearing material as claimed in claim 4 wherein the bearing surface is an electrolessly deposited layer of nickel.

9. The bearing material as claimed in claim 8 wherein the bearing surface has a thickness of from about 0.05 to 0.3 mils.

10. The bearing material as claimed in claim 9 wherein the metallic bearing surface has a thickness of about 0.1 mil.

* * * * *